United States Patent Office 3,016,537
Patented Jan. 9, 1962

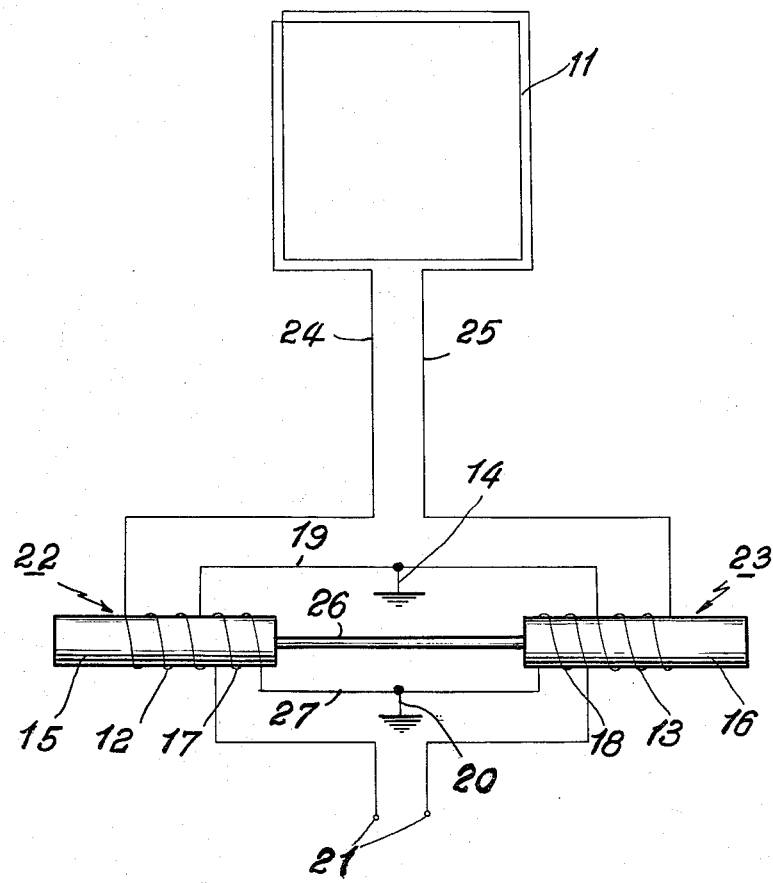

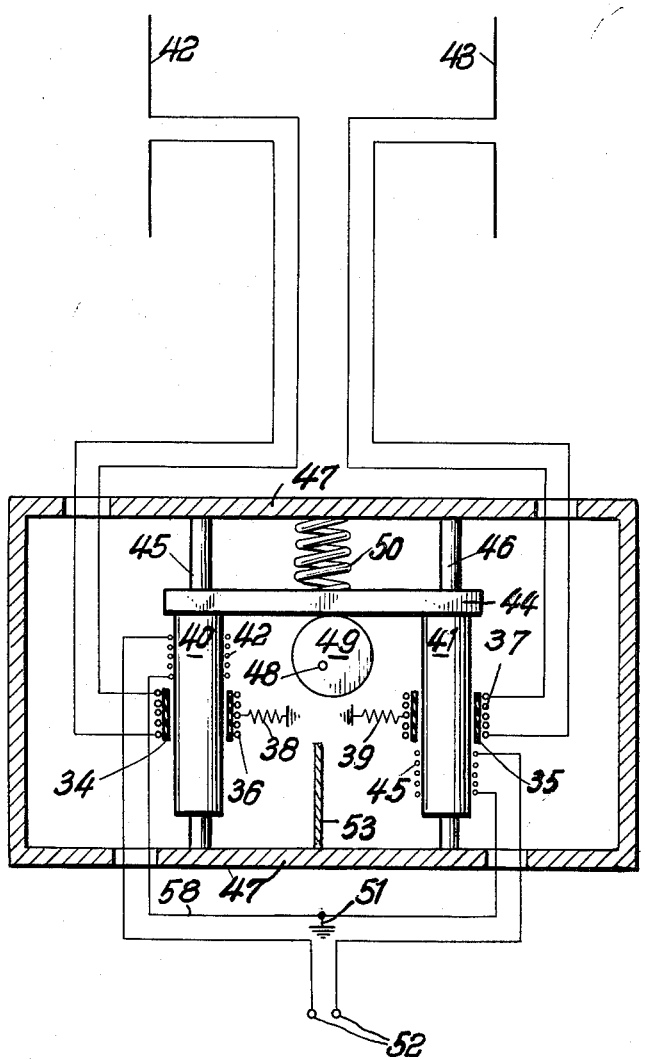

3,016,537
DIRECTION FINDER ANTENNA SYSTEM
Albert Troost and Rudi Sacher, Ulm (Danube), Germany, assignors to Telefunken G.m.b.H., Berlin, Germany
Filed June 25, 1958, Ser. No. 744,369
Claims priority, application Germany July 9, 1957
5 Claims. (Cl. 343—850)

The present invention relates to antenna systems and, more particularly, to antenna systems having new and improved balancing circuits.

In the antenna systems which are used for measuring, such as direction finding, it is important that the antennas are balanced with respect to large bodies nearby and with respect to ground. It is important that the two antennas, or the two sides of a single antenna, used in a direction finding system, are balanced with respect to a midpoint, so that the direction reading produced by the antenna system is not adversely affected by the presence of large bodies, such as aircraft, buildings, or the earth near the antenna. Balancing circuits, generally, are not new, but all of the prior art circuits have proved to contain inherent disadvantages. In some of the prior art systems, true balance is not really obtained, because adjustments in the balancing circuits tend to modify both sides of the system in unequal amounts. Other prior art systems gave rise to unwanted and disturbing reflections in the coupling networks between the antennas and the receiving equipment.

The device according to the present invention comprises circuits by which antennas are coupled to appropriate receiving equipment, such circuits comprising symmetrical transformers. Since these devices may have manufacturing inaccuracies, and since it is desirable to provide for proper balancing between the antennas, the symmetry of the entire system may be controlled by suitable adjustments in the magnetic fields of the individual transformers. The coupling of the transformers, as well as the inductive impedance thereof, may be modified by the adjustment means, whereby the ratio of gain to loss in the two sides of the system can be modified. To avoid unbalance, due to modification of the inductances of the transformers, the balancing circuit according to this invention includes means to compensate a variation in the inductance of one side of the circuit with a corresponding modification in the inductance of the other side of the circuit.

It is an object of the present invention to provide a new and improved antenna system.

It is another object of this invention to provide a new and improved antenna system which includes a balancing coupling circuit.

It is a further object of this invention to provide a new and improved coupling circuit between an antenna system and a receiver input.

It is still another object of this invention to provide a new and improved balancing circuit for direction finding equipment which couples the antenna system to the receiver system.

It is another object of this invention to provide an adjustable antenna coupling having constant inductance.

Briefly, one aspect of this invention contemplates the coupling of a direction finding antenna system to a receiving system by means of two transformers connected in opposition. These transformers have a common connection between the primaries and a second common connection between the secondaries and have the primary of each transformer connected to one side of the antenna system and the secondaries of the transformers connected to the receiver. Cores of magnetic material are mounted within the transformers, so that they may be commonly and uniformly adjusted. These cores are so mounted that they move in concert so as to provide the proper adjustment for completely and adequately balancing the antenna system with respect to any large bodies adjacent to them.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 schematically illustrates a loop antenna having a balancing circuit in accordance with the principles of this invention, and FIGURE 2 schematically illustrates a pair of dipole antennas incorporating a balancing circuit of a form different from that of FIGURE 1, but utilizing the principles of this invention.

Referring in more detail to the drawings and, more particularly, to FIGURE 1, a directional loop antenna 11 is provided which has two turns. A lead 24 connects one side of this antenna 11 to a primary 12 of a transformer 22. The other side of the primary 12 is connected by a line 19 to the primary 13 of a transformer 23. The other side of the primary 13 is connected by a conductor 25 to the other side of the antenna 11. The transformer 22 comprises, in addition to the primary 12, a secondary 17 which has one side connected to a terminal 21 for connection to appropriate receiving equipment and another side connected by a line 27 to one side of a secondary 18 of the transformer 23. The other side of the secondary 18 is connected to a second output terminal 21 for connection to appropriate receiving equipment. The line 19 is connected to ground at 14, and the line 27, which interconnects the two secondaries, is also connected to ground at 20, to serve as center points for the two sides of the system.

The transformer 22 has a core 15 of paramagnetic material passing through the primary 12, the secondary 17 being mounted on this core. The transformer 23 also has a core 16 of paramagnetic material which passes through the primary winding 13 and has the secondary winding 18 mounted thereon. The two paramagnetic cores 15 and 16 are mechanically interconnected by means of a rigid member 26 so that the two cores 15 and 16 can be simultaneously adjusted.

The ratios of turns of the transformers are so chosen that there is a voltage multiplication between the antenna 11 and the output terminals 21. The cores 15 and 16 may be formed of any suitable magnetic material which will not produce undue losses at the radio frequencies at which the system is to be used. Ferrite is preferably used as magnetic material. The high permeability of ferrite increases the permeability of the entire transformer to the point where a small number of turns is required in the windings, thus reducing the effective interturn capacitance which is detrimental to such operation.

The grounding of the lead 19 which connects one side of the primary 12 with one side of the primary 13 serves to provide a symmetrical arrangement for the primaries about ground. Similarly, grounding of the line 27, which connects one side of secondary 17 with one side of secondary 18, serves to provide a center about which the secondaries are symmetrical.

However, due to manufacturing variations and the differences in distance of one side of antenna 11 with respect to the other side from large objects, such as buildings, aircraft and the like, the system may not be truly symmetrical about ground. For this reason, the cores 15 and 16 are made adjustable within the primaries 12 and 13. If, for example, the core 15 were moved towards the left, the coupling between the primary 12 and the secondary 17 would increase. Since the core 15 is rigidly connected to the core 16 by means of the mechanical member 26, and since the secondary 17 is moved into closer coupling with the primary 12, the secondary 18 would be moved into a looser coupling relationship with the primary 13. Thus, a simple adjustment of the cores 15 and 16 can modify the impedance and coupling characteristics of the two sides of the system. At the same time, the changes in the two transformers 22 and 23 produced by a movement of the cores are in opposite directions and, therefore, the inductive variations in the system are maintained substantially constant.

As illustrated in FIGURE 1, the transformers 22 and 23 are so constructed that the primaries 12 and 13 are on the outside of the system with the secondaries 17 and 18 between the two primaries. The opposite arrangement is also feasible according to this invention, i.e., the primaries of the transformers can be placed within the secondaries. In the latter case, the movement of the cores would also produce equal and opposite effects in the two transformers. To avoid undesirable changes in the operations of the circuit, due to the movements of the cores 15 and 16, they should be made sufficiently long so that the motion of these cores for adjusting is insignificant by comparison. The movements of the cores then change only the relative positions of the coils of the two pairs, so that the adjusting step for balancing the system comprises displacement of one coil of a pair closer to the other coil of the same pair and a simultaneous separation of the two coils of the other pair.

A modification of the antenna illustrated in FIGURE 1 is shown in FIGURE 2, in which two dipole antennas 42 and 43 are respectively connected to primary windings 36 and 37. The primary winding 36 is mounted upon an insulating tube 34 and the primary winding 37 is mounted upon an insulating tube 35. Each primary winding is center tapped, the center tap of the winding 36 being connected to ground through a resistor 38 and the center tap of the primary winding 37 being connected to ground through a resistor 39. The tubes 34 and 35 spacedly surround tubular paramagnetic cores 40 and 41. Also mounted on core 40 is a secondary winding 42, magnetically linked with the primary 36, and on the core 41, a secondary winding 45, magnetically linked with the primary winding 37. The two cores are physically connected at their tops by an insulating bar member 44 which is biased downwardly by a coil spring 50. The two cores 40 and 41 are hollow and have cylindrical supports 45 and 46 passing therethrough. A housing 47 surrounds the entire assembly and supports the rods 45 and 46, also giving support to one end of the spring 50. The bottom of the member 44 bears against an eccentric cam 49 which is mounted upon a rotatable shaft 48. The secondary windings 42 and 45 are interconnected by a conductor 58 which is grounded at 51. The other ends of the secondaries 42 and 45 are connected to output terminals 52 which, in turn, are adapted to be connected to any appropriate receiving apparatus.

The transformers formed of the primary winding 36 and the secondary winding 42 and that of the primary winding 37 and the secondary winding 45 are connected in such a manner that the output currents of the two secondaries are in opposition. Ideally, since the common connection between the secondaries 42 and 45 is grounded, identical signals received by antennas 42 and 43 would produce zero output signals across the terminals 52. However, due to manufacturing deficiencies and/or due to the presence of large buildings adjacent one or both of the antennas 42 or 43, there may appear an unbalanced output signal at the terminals 52. This unbalanced signal may be reduced to zero by appropriate rotation of the shaft 48 which, in turn, produces rotation of the eccentric cam 49, forcing the member 44 upwardly against the action of the spring 50. As the member 44 moves upwardly, it carries with it the cores 40 and 41 supporting the secondary windings 42 and 45. When the cores 40 and 41 move upwardly, the winding 42 is displaced farther away from its primary 36 and the secondary 45 is moved closer to its primary 37. Thus, the rotation of the eccentric cam 41 produces a compensating movement of the secondary windings 42 and 45 in a direction appropriate to balance the system and reduce the output signal across terminals 52 to zero when identical signals are received by the antennas 42 and 43.

Preferably, there should be no magnetic interaction between the two transformers or among the coils of the two transformers. This can be readily accomplished by spacing the cores 40 and 41 widely, so that the minimum separation of the coils of the two different transformers is much greater than the maximum separation between the coils of any single transformer. Additional shielding may be obtained by means of a conductive partition 53 which is connected to the housing 47 or may be grounded. The partition 53 reduces interaction between the two transformers by eddy current losses produced therein. The core members 40 and 41 may be of any suitable magnetic material. Ferrite has been found to be particularly useful as magnetic material in this case.

A new balancing network, useful for coupling radio antennas to appropriate receiving devices has been described above. This specification describes systems comprising only one or two antennas, but it should be appreciated that the present invention is not so limited and applies to many diverse antenna systems. By the same token, the antennas need not be either dipole or loop antennas and may not be for direction finding purposes only, i.e., the balancing systems illustrated and described in this specification may be used wherever it is desirable to balance antenna or other electrical systems about a center point. The device is simple in construction and inexpensive to make, although it is effective in accomplishing its purpose.

What is claimed is:

1. A balanced coupling system for coupling the terminals of at least one directional antenna to the terminals of a radio communication set comprising, two transformers each having a primary and a secondary winding and the windings on each transformer being mutually displaceable, the primary windings being connected to the antenna terminals and being symmetrically grounded at a center tap point; and the secondary winding being mutually connected in series across the terminals of said set and grounded at their center point of symmetry; separate permeable rods through both windings of the transformer and mechanically coupled together, the secondary windings being fixed to said rods and the sense in which said windings are interconnected being such, that axial reciprocation of the rods in the primary windings varies the mutual coupling oppositely in each of the transformers, and the rods being sufficiently long such that the inductance of the system is substantially independent of the various axial positions of the rods.

2. In a system as set forth in claim 1, said permeable rods being made of ferrite.

3. In a system as set forth in claim 1, said windings all being arranged along a common axis coinciding with the axes of said rods; and rod moving means connected to axially position the rods by simultaneous unitary movement.

4. In a system as set forth in claim 1, a frame, said transformers being disposed side-by-side in said frame with their axes mutually parallel, and said rods both having an axial bore therethrough; a pair of mutually spaced guide bars mounted in said frame and passed through said bores to support the rods; a transverse coupling member rigidly joining the rods for unitary axial motion on the bars; and rotary cam means journalled in the frame and contacting the coupling member for axially reciprocating the latter.

5. In a system as set forth in claim 1, shield means interposed between said transformers and mutually decoupling the latter.

References Cited in the file of this patent

UNITED STATES PATENTS

| | | |
|---|---|---|
| 2,248,763 | Kreienfeld | July 8, 1941 |
| 2,511,662 | Bachman | June 13, 1950 |
| 2,910,695 | Troost et al. | Oct. 27, 1959 |

FOREIGN PATENTS

| | | |
|---|---|---|
| 878,974 | Germany | June 8, 1953 |